(12) United States Patent
Hannuksela

(10) Patent No.: US 7,289,506 B1
(45) Date of Patent: Oct. 30, 2007

(54) DATA TRANSMISSION

(75) Inventor: Miska Hannuksela, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/560,217

(22) Filed: Apr. 28, 2000

(30) Foreign Application Priority Data

Apr. 29, 1999 (FI) ...................................... 990970

(51) Int. Cl.
*H04L 12/28* (2006.01)
(52) U.S. Cl. .................................................... 370/394
(58) Field of Classification Search ................ 370/394, 370/465, 470, 477; 709/230, 231, 236, 232, 709/233; 375/240; 386/111; 348/578, 699, 348/14.16, 419.1; 382/238
See application file for complete search history.

(56) References Cited

U.S. PATENT DOCUMENTS

| | | | | |
|---|---|---|---|---|
| 5,564,001 | A | 10/1996 | Lewis ......................... | 395/154 |
| 5,886,735 | A * | 3/1999 | Bullister .................. | 348/14.16 |
| 5,928,330 | A * | 7/1999 | Goetz et al. ................ | 709/231 |
| 5,929,940 | A * | 7/1999 | Jeannin ...................... | 348/699 |
| 5,959,690 | A * | 9/1999 | Toebes et al. .............. | 348/578 |
| 5,991,503 | A * | 11/1999 | Miyasaka et al. ........... | 386/111 |
| 6,040,866 | A * | 3/2000 | Chen et al. ............... | 348/419.1 |
| 6,111,863 | A * | 8/2000 | Rostoker et al. ........... | 370/329 |
| 6,434,319 | B1 * | 8/2002 | Wine ........................... | 386/46 |
| 6,611,561 | B1 | 8/2003 | Hannuksela et al. ... | 375/240.27 |
| 6,731,811 | B1 * | 5/2004 | Rose .......................... | 382/238 |
| 6,788,740 | B1 * | 9/2004 | van der Schaar et al. .. | 375/240 |

FOREIGN PATENT DOCUMENTS

| | | |
|---|---|---|
| EP | 0 634 871 A2 | 1/1995 |
| WO | WO 97/30551 | 8/1997 |
| WO | WO 98/37699 * | 8/1998 |
| WO | WO98/37699 * | 8/1998 |
| WO | WO 99/00984 | 1/1999 |

OTHER PUBLICATIONS

ITU is author, "ITU-T H.263" dated Feb. 1998, published by ITU, pp. 109-114.*
Patent Abstract of Japan, JP 06205385 A, Jul. 22, 1994, Senda Yuzo, pp. 2.
"Studio Encoding Parameters Of Digital Television For Standard 4:3 And Wide-Screen 16:9 Aspect Ratios", Recommendation ITU-R BT.601-5.
"Video Codec For Audiovisual Services At *p*x64 kbits", ITU-T Recommendation H.261.
Patent Abstract of Japan, JP 06205384 A, Jul. 22, 1994, Senda Yuzo, pp. 2.

* cited by examiner

*Primary Examiner*—Edan Orgad
*Assistant Examiner*—Robert W. Wilson
(74) *Attorney, Agent, or Firm*—Perman & Green, LLP

(57) ABSTRACT

A data transmission system is provided for transmitting a data signal between a server and a communications terminal over a transmission link having a variable bandwidth. The data signal is a scalable compressed multimedia clip comprising a sequence of images. Each image has a base layer and a number of enhancement layers. To cope with variability in the bandwidth, the sequence is re-ordered so that the base layers have greater safety times than the enhancement layers. This allows all of the base layers to arrive in time to be played at the expense of the enhancement layers.

66 Claims, 13 Drawing Sheets

DATA TRANSMISSION

FIELD OF THE INVENTION

This invention relates to data transmission and is particularly, but not exclusively, related to transmission of data representative of picture sequences, such as video. It is particularly suited to transmission over links susceptible to errors and loss of data.

BACKGROUND OF THE INVENTION

During the past few years, the amount of multimedia content available through the Internet has increased considerably. Since data delivery rates to mobile terminals are becoming high enough to enable such terminals to be able to retrieve multimedia content, it is becoming desirable to enable mobile terminals to retrieve video and other multimedia content from the Internet. An example of a high-speed data delivery system is the upcoming GSM phase 2+.

The term multimedia as used herein applies to both sound and pictures, to sound only and to pictures only. Sound may include speech and music.

Network traffic through the Internet is based on a transport protocol called the Internet Protocol (IP). IP is concerned with transporting data packets from one location to another. It facilitates the routing of packets through intermediate gateways, that is, it allows data to be sent to machines that are not directly connected in the same physical network. The unit of data transported by the IP layer is called an IP datagram. The delivery service offered by IP is connectionless, that is IP datagrams are routed around the Internet independently of each other. Since no resources are permanently committed within the gateways to any particular connection, the gateways may occasionally have to discard datagrams because of lack of buffer space or other resources. Thus, the delivery service offered by IP is a best effort service rather than a guaranteed service.

Internet multimedia is typically streamed over the User Datagram Protocol (UDP), the Transmission Control Protocol (TCP) or the Hypertext Transfer Protocol (HTTP).

UDP is a connectionless lightweight transport protocol. It offers very little above the service offered by IP. Its most important function is to deliver datagrams between specific transport endpoints. Consequently, the transmitting application has to take care of how to packetize data to datagrams. Headers used in UDP contain a checksum that allows the UDP layer at the receiving end to check the validity of the data. Otherwise, degradation of IP datagrams will in turn affect UDP datagrams. UDP does not check that the datagrams have been received, does not retransmit missing datagrams, nor does it guarantee that the datagrams are received in the same order as they were transmitted.

UDP introduces a relatively stable throughput having a small delay since there are no retransmissions. Therefore it is used in retrieval applications to deal with the effect of network congestion and to reduce delay (and jitter) at the receiving end. However, the client must be able to recover from packet losses and possibly conceal lost content. Even with reconstruction and concealment, the quality of a reconstructed clip suffers somewhat. On the other hand, playback of the clip is likely to happen in real-time without annoying pauses. Firewalls, whether in a company or elsewhere, may forbid the usage of UDP because it is connectionless.

TCP is a connection-orientated transport protocol and the application using it can transmit or receive a series of bytes with no apparent boundaries as in UDP. The TCP layer divides the byte stream into packets, sends the packets over an IP network and ensures that the packets are error-free and received in their correct order. The basic idea of how TCP works is as follows. Each time TCP sends a packet of data, it starts a timer. When the receiving end gets the packet, it immediately sends an acknowledgement back to the sender. When the sender receives the acknowledgement, it knows all is well, and cancels the timer.

However, if the IP layer loses the outgoing segment or the return acknowledgement, the timer at the sending end will expire. At this point, the sender will retransmit the segment. Now, if the sender waited for an acknowledgement for each packet before sending the next one, the overall transmission time would be relatively long and dependent on the round-trip delay between the sender and the receiver. To overcome this problem, TCP uses a sliding window protocol that allows several unacknowledged packets to be present in the network. In this protocol, an acknowledgement packet contains a field filled with the number of bytes the client is willing to accept (beyond the ones that are currently acknowledged). This window size field indicates the amount of buffer space available at the client for storage of incoming data. The sender may transmit data within the limit indicated by the latest received window size field. The sliding window protocol means that TCP effectively has a slow start mechanism. At the beginning of a connection, the very first packet has to be acknowledged before the sender can send the next one. Typically, the client then increases the window size exponentially. However, if there is congestion in the network, the window size is decreased (in order to avoid congestion and to avoid receive buffer overflow). The details how the window size is changed depend on the particular TCP implementation in use.

A multimedia content creation and retrieval system is shown in FIG. 1. The system has one or more media sources, for example a camera and a microphone. Alternatively, multimedia content can also be synthetically created without a natural media source, for example animated computer graphics and digitally generated music. In order to compose a multimedia clip consisting of different media types, such as video, audio, text, images, graphics and animation, raw data captured from the sources are edited by an editor. Typically the storage space taken up by raw (uncompressed) multimedia data is huge. It can be megabytes for a video sequence which can include a mixture of different media, for example animation. In order to provide an attractive multimedia retrieval service over low bit rate channels, for example 28.8 kbps and 56 kbps, multimedia clips are compressed in the editing phase. This typically occurs off-line. The clips are then handed to a multimedia server. Typically, a number of clients can access the server over one or more networks. The server is able to respond to the requests presented by the clients. The main task of the server is to transmit a desired multimedia clip to the client which the client decompresses and plays. During playback, the client utilizes one or more output devices, such as a screen and a loudspeaker. In some circumstances, clients are able to start playback while data are still being downloaded.

It is convenient to deliver a clip by using a single channel which provides a similar quality of service for the entire clip. Alternatively different channels can be used to deliver different parts of a clip, for example sound on one channel and pictures on another. Different channels may provide different qualities of service. In this context, quality of service includes bit rate, loss or bit error rate and transmission delay variation.

In order to ensure multimedia content of a sufficient quality is delivered, it is provided over a reliable network connection, such as TCP, which ensures that received data are error-free and in the correct order. Lost or corrupted protocol data units are retransmitted. Consequently, the channel throughput can vary significantly. This can even cause pauses in the playback of a multimedia stream whilst lost or corrupted data are retransmitted. Pauses in multimedia playback are annoying.

Sometimes retransmission of lost data is not handled by the transport protocol but rather by some higher-level protocol. Such a protocol can select the most vital lost parts of a multimedia stream and request the retransmission of those. The most vital parts can be used for prediction of other parts of the stream, for example.

In order to understand the invention better, descriptions of the elements of the retrieval system, namely the editor, the server and the client, are set out below.

A typical sequence of operations carried out by the multimedia clip editor is shown in FIG. 2. Raw data are captured from one or more data sources. Capturing is done using hardware, device drivers dedicated to the hardware and a capturing application which controls the device drivers to use the hardware. Capturing hardware may consist of a video camera connected to a PC video grabber card, for example. The output of the capturing phase is usually either uncompressed data or slightly compressed data with irrelevant quality degradations when compared to uncompressed data. For example, the output of a video grabber card could be in an uncompressed YUV 4:2:0 format or in a motion-JPEG format. The YUV colour model and the possible sub-sampling schemes are defined in Recommendation ITU-R BT.601-5 "Studio Encoding Parameters of Digital Television for Standard 4:3 and Wide-Screen 16:9 Aspect Ratios". Relevant digital picture formats such as CIF, QCIF and SQCIF are defined in Recommendation ITU-T H.261 "Video Codec for Audiovisual Services at p×64 kbits" (section 3.1 "Source Formats").

During editing separate media tracks are tied together in a single timeline. It is also possible to edit the media tracks in various ways, for example to reduce the video frame rate. Each media track may be compressed. For example, the uncompressed YUV 4:2:0 video track could be compressed using ITU-T recommendation H.263 for low bit rate video coding. If the compressed media tracks are multiplexed, they are interleaved so that they form a single bitstream. This clip is then handed to the multimedia server. Multiplexing is not essential to provide a bitstream. For example, different media components such as sounds and images may be identified with packet header information in the transport layer. Different UDP port numbers can be used for different media components.

A typical sequence of operations carried out by the multimedia server is shown in FIG. 3. Typically multimedia servers have two modes of operation; they deliver either pre-stored multimedia clips or a live (real-time) multimedia stream. In the first mode, clips are stored in a server database, which is then accessed on-demand by the server. In the second mode, multimedia clips are handed to the server as a continuous media stream that is immediately transmitted to clients. Clients control the operation of the server by an appropriate control protocol being at least able to select a desired media clip. In addition, servers may support more advanced controls. For example, clients may be able to stop the transmission of a clip, to pause and resume transmission of a clip, and to control the media flow in case of a varying throughput of the transmission channel in which case the server must dynamically adjust the bitstream to fit into the available bandwidth.

A typical sequence of operations carried out by the multimedia retrieval client is shown in FIG. 4. The client gets a compressed and multiplexed media clip from a multimedia server. The client demultiplexes the clip in order to obtain separate media tracks. These media tracks are then decompressed to provide reconstructed media tracks which are played out with output devices. In addition to these operations, a controller unit is provided to interface with end-users, that is to control playback according to end-user input and to handle client-server control traffic. It should be noted that the demultiplexing-decompression-playback chain can be done on a first part of the clip while still downloading a subsequent part of the clip. This is commonly referred to as streaming. An alternative to streaming is to download the whole clip to the client and then demultiplex it, decompress it and play it.

A typical approach to the problem of varying throughput of a channel is to buffer media data in the client before starting the playback and/or to adjust the transmitted bit rate in real-time according to channel throughput statistics.

One way of tackling the problem of pauses is by using dynamic bit rate adjustment in the multimedia server. However, the server may not react to network congestion sufficiently quickly to avoid pausing in the client. In addition, the server cannot control the retransmission mechanism of TCP (or other underlying protocols, such as IP).

Even if dynamic bit rate adjustment is used, the client has to do some initial buffering in any case to avoid delivery delays caused by retransmission. If a constant channel bit rate is assumed, one can calculate the point in time at which a data unit is supposed to have been completely received. In addition, one can calculate the point in time by which a data unit is supposed to have been played. The time difference between these two points in time is referred to as the safety time. Another way of defining the safety time is to state that it is the maximum time between two consecutively received data units which does not cause pausing in the playback.

When calculating the safety times for a clip, each data unit has to be considered separately. The calculations assume that no throughput drops occur before the data unit that is currently being processed. If the maximum throughput of the channel is equal to the average bit rate of the multimedia clip, the client cannot recover from a drop in the amount of received bits after throughput has dropped. The only way to guarantee some protection against throughput drops is to buffer some data before starting playback. If the channel stops providing data, the client can still play the stream while there are data in a buffer. Thus, the average safety time is approximately equal to the initial buffering time. Since the bit rate of the clip may vary, the safety time also may vary and the minimum safety time is thus equal to or less than the initial buffering delay.

HTTP, the Hypertext Transfer Protocol, is the basis of the World Wide Web (WWW). It is a simple protocol. A client establishes a TCP connection to a server, issues a request, and reads back the server's response. The server denotes the end of its response by closing the connection. The arrangement of protocol layers is typically HTTP on TCP which is on IP.

The most common HTTP request is called GET. The GET request is associated with a universal resource identifier (URI) which uniquely specifies the requested item. The server responds to the GET request by returning the file corresponding to the specified URI. The file returned by the server normally contains pointers (hypertext links) to other files that can reside on other servers. A user can therefore easily follow the links from file to file.

Servers used for Internet multimedia retrieval are either dedicated multimedia servers or normal WWW servers.

Dedicated multimedia servers are typically capable of transmission over HTTP, TCP and UDP protocols. They may be able to readjust the contents of media clips dynamically to meet the available network bandwidth and to avoid network congestion. They may also support fast forward and fast rewind operations as well as live multimedia streaming. They can provide a number of streams simultaneously.

Multimedia servers based on normal WWW servers are also referred to as server-less or HTTP multimedia solutions. The multimedia clips are streamed over HTTP. Since this type of server has no control over the contents of the stream, no flow (bandwidth) control can be applied, and it cannot respond to network congestion. Therefore, sudden pauses in the playback can occur. Consequently there must be a relatively long initial buffering delay in the client before starting the playback to avoid such sudden pauses. Fast-forwarding a multimedia stream from a standard WWW server is not possible. Live multimedia streaming must be implemented using special tricks, such as Java programming.

When a streamed multimedia clip is received, a suitable independent media player application or a browser plug-in can be used to play it. Such multimedia players differ largely from browser to browser. Newer browsers may have some integrated plug-ins for the most popular streaming video players.

There are a number of different data transmission methods available for transmitting data between mobile terminals and their networks. One of the best known methods is GSM (Global System for Mobile communications).

The current GSM data service called Circuit Switched Data (CSD) offers a 9.6 kbps circuit-switched channel. It is intended for GSM to provide a 14.4 kbps data channel having forward error correction (FEC) and status information. High Speed. Circuit Switched Data (HSCSD) provides multiple 9.6 kbps or 14.4 kbps time slots for a single user at the same time. There are symmetric and asymmetric connections. In a symmetric connection, the air interface resources are allocated symmetrically, and provide the same data transmission rate in both directions. In an asymmetric connection, different data rates are supported for up-link and for down-link. However, asymmetric air interface connections are applicable only in non-transparent mode (see below).

Circuit-switched GSM data systems, CSD and HSCSD, offer two basic connection types, namely transparent (T) and non-transparent (NT). These are distinguished by the way they correct transmission errors. In a transparent connection, error correction is done solely by a forward error correction mechanism provided by the radio interface transmission scheme. The connection is considered as a synchronous circuit. The available throughput is constant, and the transmission delay is fixed. The transmitted data are likely to contain bit inversion errors. In a non-transparent connection, the GSM circuit connection is regarded as a packet (or frame) data flow although the end-to-end service is circuit-switched. Each frame includes redundancy bits to enable a receiver to detect remaining errors. There are two sources of error, packet drops and corruption due to interference in the radio frequency path. The latter can be recovered by redundancy checking. The Radio Link Protocol (RLP) is used to provide retransmission in case of remaining errors in frame. If a frame is found to be correct, the receiver acknowledges this fact. If it is found not to be correct, a negative acknowledgement is sent and the indicated frame is retransmitted. Consequently, a non-transparent connection is error-free but throughput and transmission delay vary.

Other network types exist, for example GPRS (General Packet Radio System). In GPRS the transmissions are truly packet based.

A video sequence consists of a series of still pictures. Video compression methods are based on reducing redundant and perceptually irrelevant parts of video sequences. The redundancy in video sequences can be categorised into spatial, temporal and spectral redundancy. Spatial redundancy means the correlation between neighbouring pixels. Temporal redundancy means that the same objects appear in consecutive pictures. Reducing the temporal redundancy reduces the amount of data required to represent a particular image sequence and thus compresses the data. This can be achieved by generating motion compensation data, which describe the motion between the current and a previous (reference) picture. In effect, the current picture is predicted from the previous one. Spectral redundancy means the correlation between the different colour components of the same picture.

Simply reducing the redundancy of the sequence does not usually compress it enough. Therefore, some video encoders try to reduce the quality of those parts of a video sequence which are subjectively the least important. In addition, the redundancy of the encoded bitstream is reduced by means of efficient lossless coding of compression parameters and coefficients. The main technique is to use variable length codes.

Video compression methods typically differentiate between pictures that can use temporal redundancy reduction and those that cannot. Compressed pictures, which do not use temporal redundancy reduction methods, are usually called INTRA or I-frames whereas temporally predicted pictures are called INTER or P-frames. In the INTER frame case, the predicted (motion-compensated) picture is rarely precise enough, and therefore a spatially compressed prediction error picture is also associated with each INTER frame.

Temporal scalability provides a mechanism for enhancing perceptual quality by increasing the picture display rate. This is achieved by taking a pair of consecutive reference pictures and bi-directionally predicting a B-picture from either one or both of them. The B-picture can then be played in sequence between the two anchor pictures. This is illustrated in FIG. 5. Bi-directional temporal prediction yields a more accurately predicted picture than uni-directional prediction. Thus, for the same quantization level, B-pictures yield increased compression as compared to forwardly predicted P-pictures. B-pictures are not used as reference pictures, that is other pictures are never predicted from them. Since they can be discarded without impacting the picture quality of future pictures, they provide temporal scalability. It should be noted that while B-pictures provide better compression performance than P-pictures, they are more complex to construct and require more memory. Furthermore they introduce additional delays because bi-directional interpolation requires both reference pictures to have been received and additional calculations are required. In addition, B-pictures require more side information in the bitstream.

The term scalability refers to the capability of a compressed sequence to be decoded at different data rates. In other words, a scalable multimedia clip can be edited relatively easily while it is compressed so that it can be streamed over channels with different bandwidths and still be decoded and played back in real-time.

Scalable multimedia is typically ordered so that there are hierarchical layers of data. A base layer contains a basic representation of the multimedia clip whereas enhancement layers contain refinement data on top of underlying layers. Consequently, the enhancement layers improve the quality of the clip.

Scalability is a desirable property for heterogeneous and error prone environments. This property is desirable in order to counter limitations such as constraints on bit rate, display resolution, network throughput, and decoder complexity.

Scalability can be used to improve error resilience in a transport system where layered coding is combined with transport prioritisation. The term transport prioritisation here refers to various mechanisms to provide different qualities of service in transport, including unequal error protection, to provide different channels having different error/loss rates. Depending on their nature, data are assigned differently, for example, the base layer may be delivered through a channel with high degree of error protection, and the enhancement layers may be transmitted through more error-prone channels.

Generally, scalable multimedia coding suffers from a worse compression efficiency than non-scalable coding. In other words, a multimedia clip coded as a scalable multimedia clip with all enhancement layers requires greater bandwidth than if it had been coded as a non-scalable single-layer clip with equal quality. However, exceptions to this general rule exist, for example the temporally scalable B-frames in video compression.

In the following, scalability is discussed with reference to the ITU-T H.263 video compression standard. H.263 is an ITU-T recommendation for video coding in low bit rate communication which generally means data rates below 64 kbps. The recommendation specifies the bitstream syntax and the decoding of the bitstream. Currently, there are two versions of H.263. Version 1 consists of the core algorithm and four optional coding modes. H.263 version 2 is an extension of version 1 providing twelve new negotiable coding modes.

Pictures are coded as luminance and two colour difference (chrominance) components (Y, $C_B$ and $C_R$). The chrominance pictures are sampled with a half of the pixels along the both co-ordinate axes when compared to the luminance picture.

The scalability mode (Annex O) of H.263 specifies syntax to support temporal, signal-to noise ratio (SNR), and spatial scalability capabilities.

Spatial scalability and SNR scalability are closely related, the only difference being the increased spatial resolution provided by spatial scalability. An example of SNR scalable pictures is shown in FIG. 6. SNR scalability implies the creation of multi-rate bit streams. It allows for the recovery of coding errors, or differences between an original picture and its reconstruction. This is achieved by using a finer quantizer to encode the difference picture in an enhancement layer. This additional information increases the SNR of the overall reproduced picture.

Spatial scalability allows for the creation of multi-resolution bit streams to meet varying display requirements and/or constraints. A spatially scalable structure is illustrated in FIG. 7. It is essentially the same as in SNR scalability except that a spatial enhancement layer attempts to recover the coding loss between an up-sampled version of the reconstructed reference layer picture and a higher resolution version of the original picture. For example, if the reference layer has a quarter common intermediate format (QCIF) resolution, and the enhancement layer has a common intermediate format (CIF) resolution, the reference layer picture must be scaled accordingly such that the enhancement layer picture can be predicted from it. The QCIF standard allows the resolution to be increased by a factor of two in the vertical direction only, horizontal direction only, or both the vertical and horizontal directions for a single enhancement layer. There can be multiple enhancement layers, each increasing the picture resolution over that of the previous layer. The interpolation filters used to up-sample the reference layer picture are explicitly defined in the H.263 standard. Aside from the up-sampling process from the reference to the enhancement layer, the processing and syntax of a spatially scaled picture are identical to those of an SNR scaled picture.

In either SNR or spatial scalability, the enhancement layer pictures are referred to as EI- or EP-pictures. If the enhancement layer picture is upwardly predicted from a picture in the reference layer, then the enhancement layer picture is referred to as an Enhancement-I (EI) picture. In this type of scalability, the reference layer means the layer "below" the current enhancement layer. In some cases, when reference layer pictures are poorly predicted, over-coding of static parts of the picture can occur in the enhancement layer, causing an unnecessarily excessive bit rate. To avoid this problem, forward prediction is permitted in the enhancement layer. A picture that can be predicted in the forward direction from a previous enhancement layer picture or, alternatively, upwardly predicted from the reference layer picture is referred to as an Enhancement-P (EP) picture. Note that computing the average of the upwardly and forwardly predicted pictures can provide bi-directional prediction for EP-pictures. For both EI- and EP-pictures, upward prediction from the reference layer picture implies that no motion vectors are required. In the case of forward prediction for EP-pictures, motion vectors are required.

In multi-point and broadcast multimedia applications, constraints on network throughput may not be foreseen at the time of encoding. Thus, a scalable bitstream should be used. FIG. 8 shows an IP multicasting arrangement where each router can strip the bitstream according to its capabilities. It shows a server S providing a bitstream to a number of clients C. The bitstreams are routed to the clients by routers R. In this example, the server is providing a clip which can be scaled to at least three bit rates, 120 kbit/s, 60 kbit/s and 28 kbit/s.

If the client and server are connected via a normal uni-cast connection, the server may try to adjust the bit rate of the transmitted multimedia clip according to the temporary channel throughput. One solution is to use a layered bit stream and to adapt to bandwidth changes by varying the number of transmitted enhancement layers.

SUMMARY OF THE INVENTION

According to a first aspect of the invention there is provided a method of transmitting a data signal having a sequence of data units in a predetermined order over a transmission link between a data source and a data sink comprising the step of sending the data units in an order determined by their relative importance rather than their predetermined order.

According to a second aspect of the invention there is provided a data transmission system for transmitting a data signal having a sequence of data units in a predetermined order over a transmission link between a data source and a data sink the data units being sent in an order determined by their relative importance rather than their predetermined order.

According to a third aspect of the invention there is provided a server for transmitting a data signal having a sequence of data units in a predetermined order over a transmission link the data units being sent in an order determined by their relative importance rather than their predetermined order.

Preferably the server comprises re-ordering means. Preferably the server comprises an editor for providing a scalable data signal.

According to a fourth aspect of the invention there is provided a computer program product stored on a computer usable medium comprising computer readable program means for causing transmission of a data signal having a sequence of data units in a predetermined order over a transmission link the data units being sent in an order determined by their relative importance rather than their predetermined order.

Preferably the computer program product comprises a server. In this sense it is meant that the when the computer program is loaded into hardware it causes the hardware to operate as a server device. Preferably the computer program product comprises an editor for providing a scalable data signal. Preferably the computer program product comprises re-ordering means for re-ordering the data units.

According to a fifth aspect of the invention there is provided a data signal having a sequence of data units for transmission over a transmission link between a data source and a data sink the data units being in an order determined by their relative importance rather than their predetermined order.

Preferably where the data units or layers of the data units are ordered into a sequence other than their original sequence, the invention also includes means or a step for returning the data units or layers of the data units into their original sequence.

The transmission link may simply be a bottleneck where congestion is occurring and the invention is used to overcome the bottleneck.

An advantage of the invention is that it can provide larger safety times than prior art arrangements with the same initial buffering. In addition, it provides some degree of protection against decreased transmission throughput. Therefore it helps in reducing the occurrence of pauses without sacrificing compression efficiency.

The invention also helps in transmitting over a unreliable network connection using transmission protocols which do not automatically retransmit but only retransmit those missing parts chosen by a higher level function, for example in response to feedback. In this case, it provides more time for retransmission of the vital parts of a data signal than prior art arrangements. Thus, vital parts of a stream are more likely to be transmitted successfully and the ultimate end user of the data signal is likely to perceive a better output quality.

Preferably the bandwidth of the transmission link available to the data signal is variable. This may be because the amount of data traffic using the link is variable, for example due to the need to re-transmit lost or corrupted data.

The invention provides a way of altering a data signal so that it can be transmitted over a transmission link having a bandwidth which would otherwise not be sufficient for it or for allowing certain of the bandwidth of its transmission link to be made available for other data, for example control information.

Preferably the effect of the invention is to increase the safety times of some data units relative to, or even at the expense of, the safety times of other data units.

Preferably the data signal is arranged in a hierarchy having a base layer and at least one enhancement layer. The term base layer means a most fundamental layer. The base layer may represent the least refined version of the data signal. In each unit, the (or each) enhancement layer, when combined with the base layer, refines the base layer to make it more like the data unit. Each enhancement layer may add more refinement to the base layer. Preferably the safety time of the base layer is increased relative to the safety times of the enhancement layers.

Preferably the data signal is scalable. The base layer and the or each enhancement layer may have a scaled relationship with respect to each other. The signal may be scalable in the temporal, the spatial, the spectral or the SNR domains.

Preferably by virtue of re-ordering the sequence the layers have safety times which depend on their position in the hierarchy. For example the base layer of a particular data unit may have a greater safety time than enhancement layers. Advantageously, the finer the level of refinement represented by a layer, the shorter its safety time.

Preferably the source is a server. Alternatively it is an editor.

Preferably the sink is a client. It may be a destination of the data signal such as a mobile terminal, for example a mobile telephone.

Preferably the data units are frames. In one embodiment the data units represent a sequence of pictures. Conveniently it is a video sequence. Most preferably, it comprises multimedia data.

It should be understood that the terms "layer" and "layers" are being used figuratively and refer to blocks of data which can be applied to each other rather than to a strictly positional relationship.

BRIEF DESCRIPTION OF THE DRAWINGS

The invention will now be described by way of example only with reference to the accompanying drawings in which.

DETAILED DESCRIPTION

FIGS. 1 to 8 have been discussed above.

Figure 1:
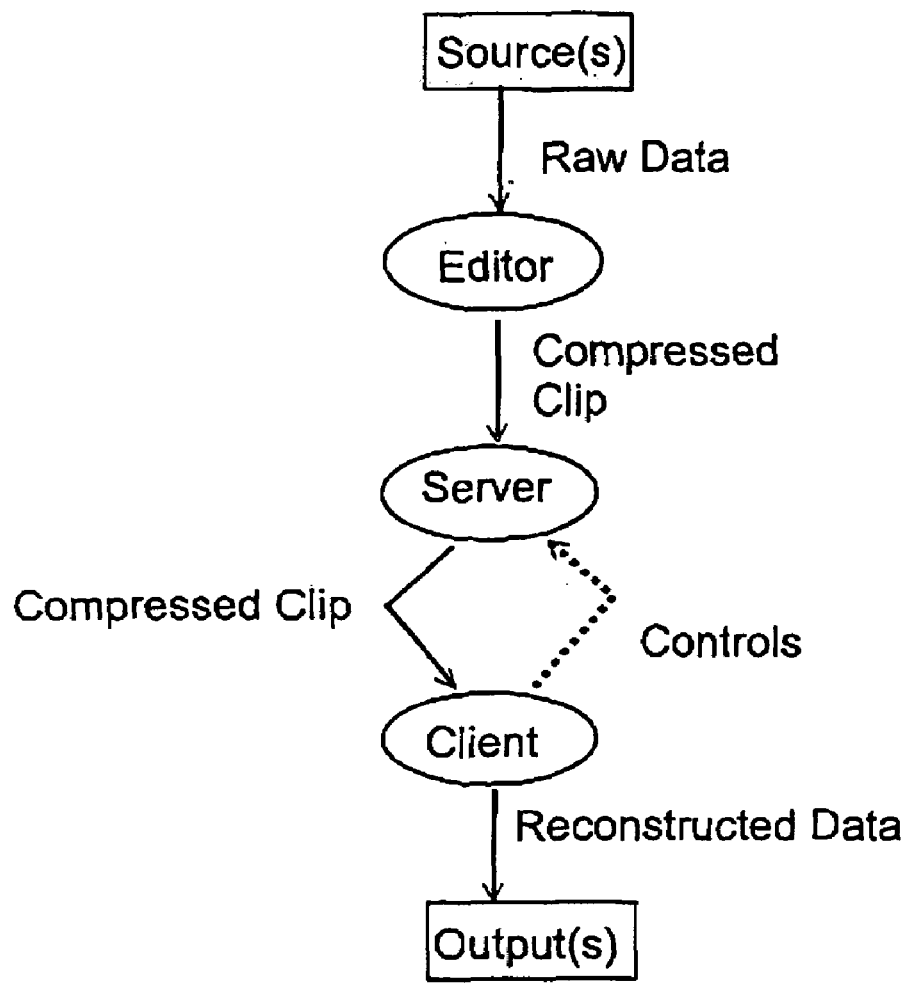
FIG. 1 shows a multimedia content creation and retrieval system.
Figure 2:
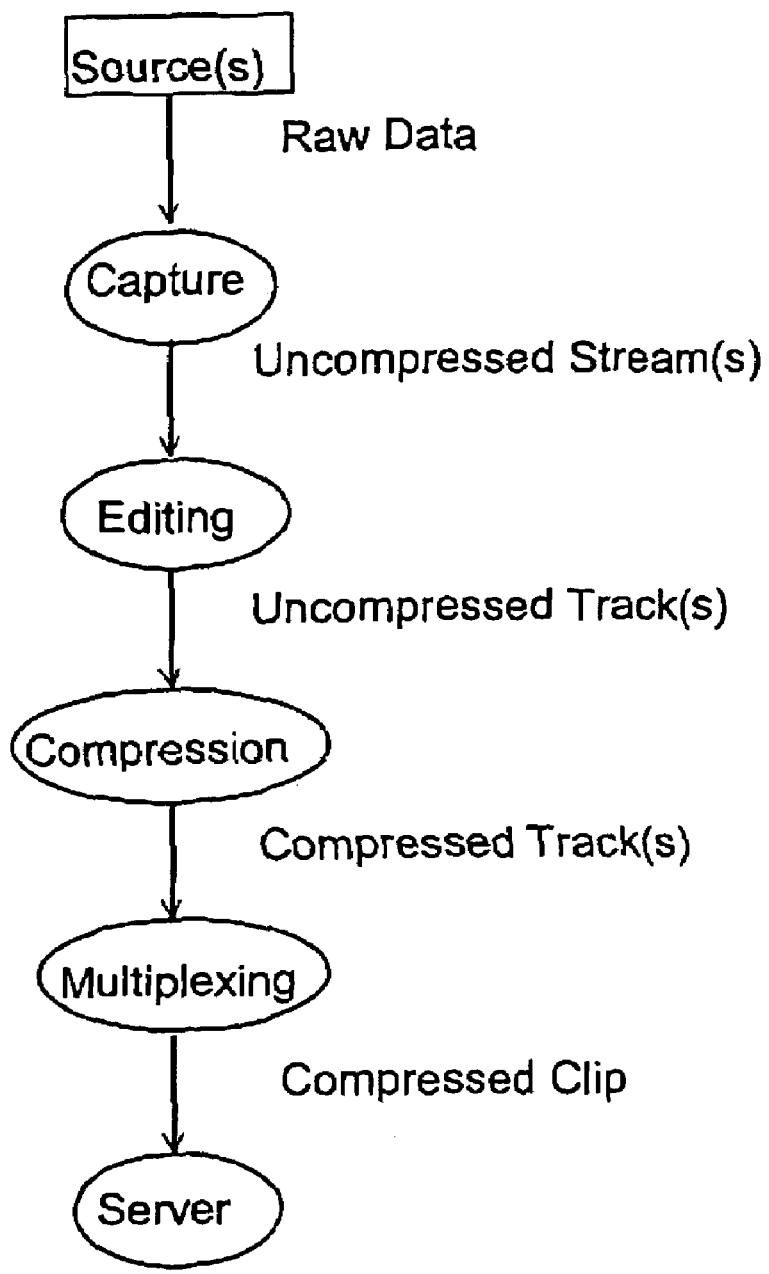
FIG. 2 shows operations of a multimedia clip editor.
Figure 3:
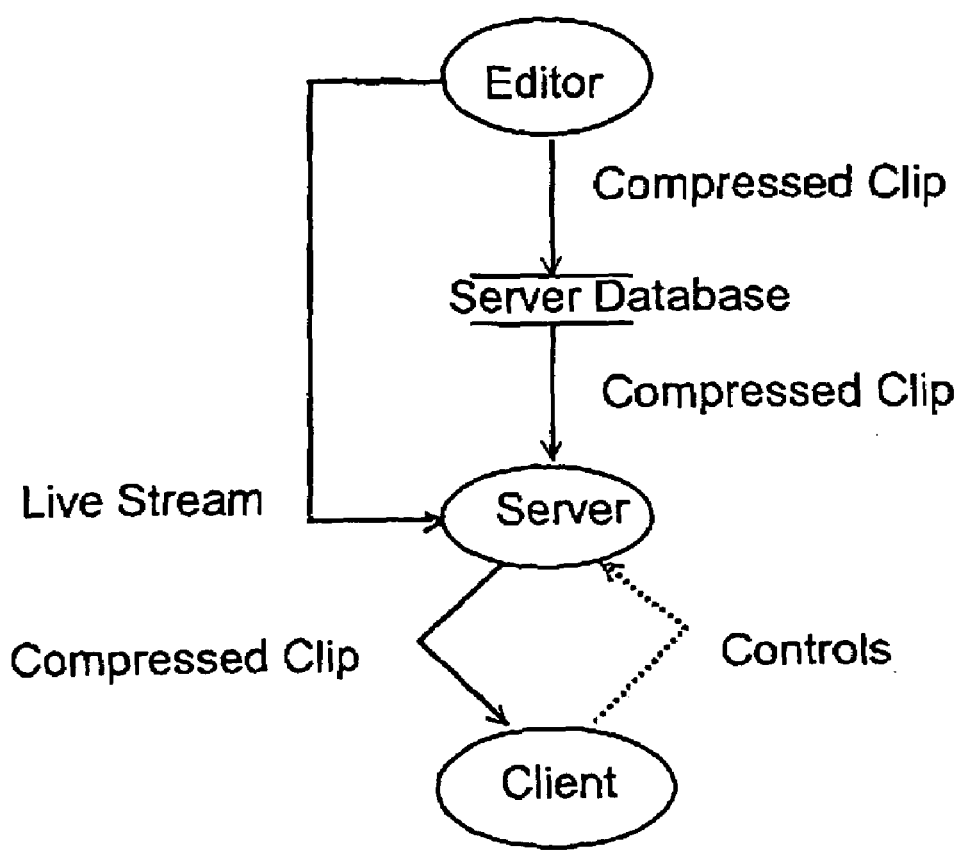
FIG. 3 shows operations of a multimedia server.
Figure 4:
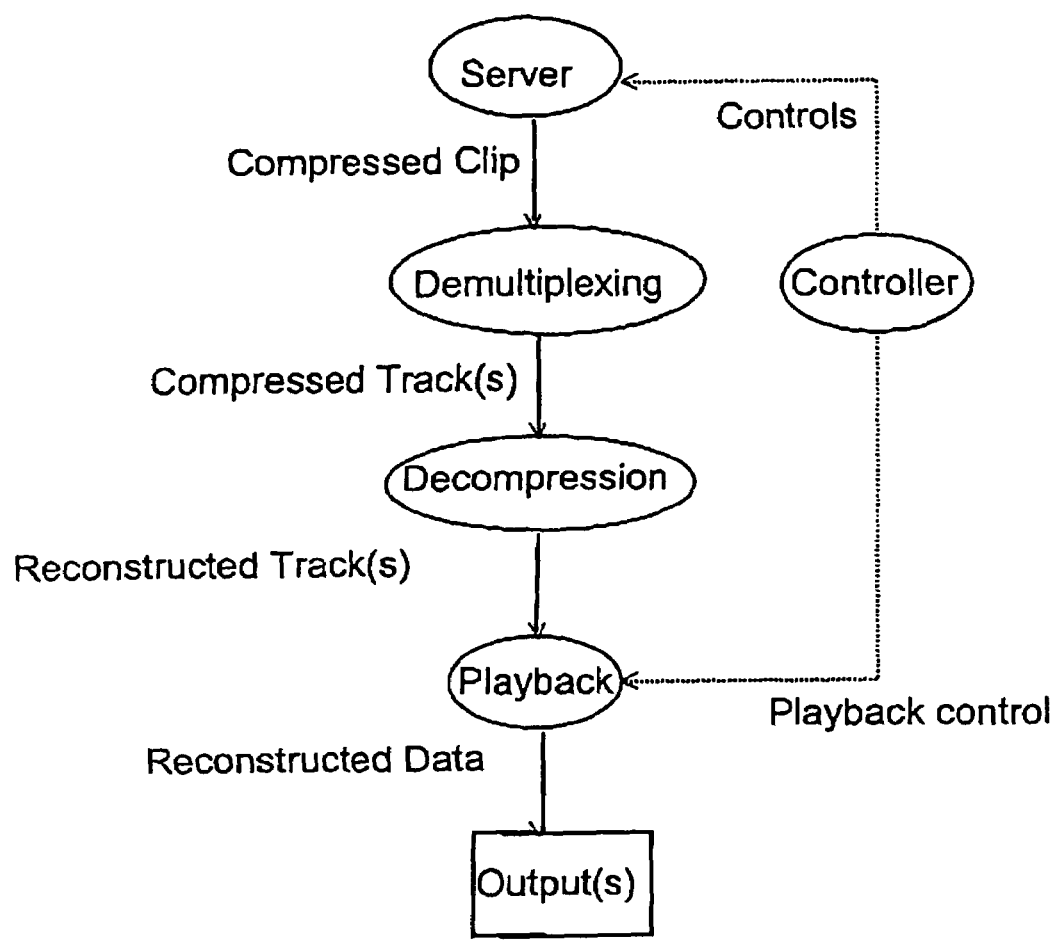
FIG. 4 shows operations of a multimedia retrieval client.
Figure 5:
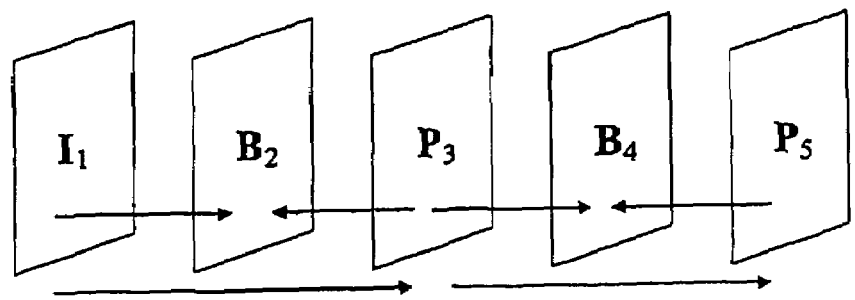
FIG. 5 shows an illustration of B picture prediction.
Figure 6:
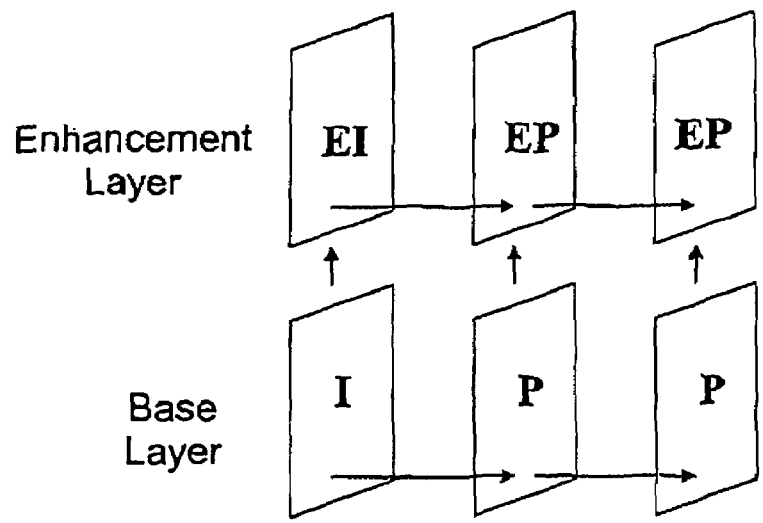
FIG. 6 shows an illustration of SNR scalability.
Figure 7:
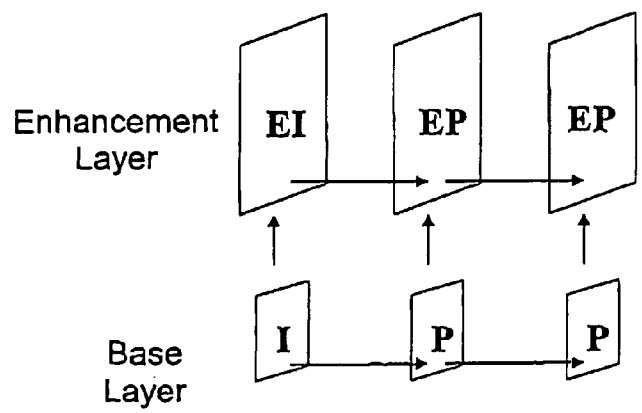
FIG. 7 shows an illustration of spatial scalability.
Figure 8:
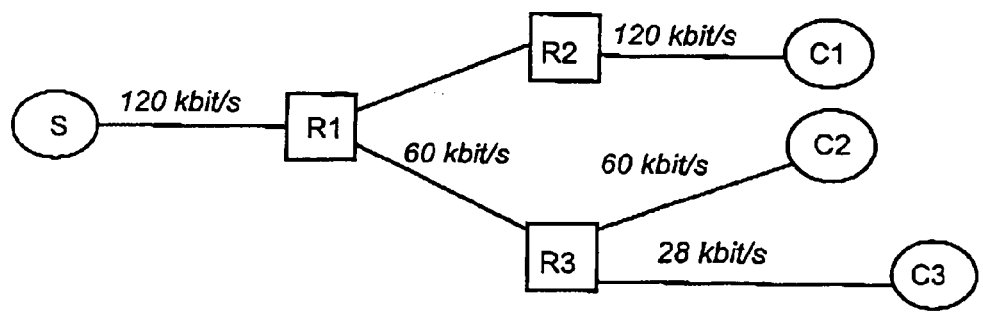
FIG. 8 shows scalable multimedia being used in an IP multicast system.
Figure 9:
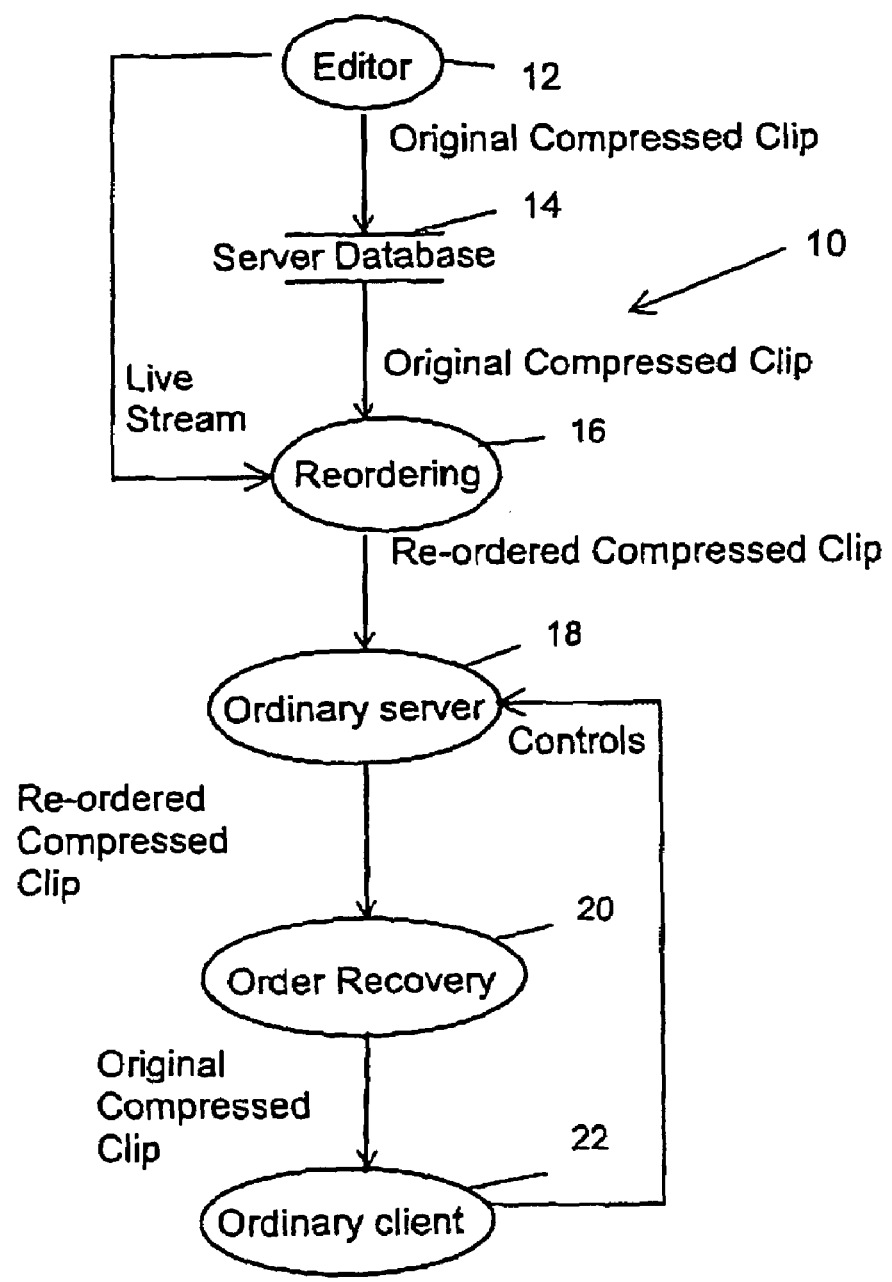
FIG. 9 shows mobile multimedia retrieval system according to the invention.

A mobile multimedia retrieval system 10 according to the invention is shown in FIG. 9. Although only a single client 22 is shown it will be appreciated that there can be, and in preferred embodiments will be, a number of such clients. It will also be appreciated that at least part of the transmission link connecting a server 18 and the client 22 will be wireless.

The system 10 comprises an editor 12 which produces a compressed clip, a server database 14 for storing the compressed clip, re-ordering means 16 for re-ordering the sequence of the compressed clip, a server 18 for sending the re-ordered compressed clip and a client comprising order recovery means 20 to recover the original sequence of the compressed clip. The client 22 controls the operation of the server, for example by specifying which data are sent and how they are sent. Clearly, the re-ordering means 16 and the order recovery means 20 need to be compatible so that the latter can recover the original order. The re-ordering means 16 could be located to operate on data before they reach the server database 14 rather than the embodiment shown in FIG. 9. Certain types of data, such as a live stream, may by-pass the database 14 and be sent by the editor 12 directly to the re-ordering means 16. Although they are shown separately in FIG. 9, the editor 12, the server database 14, the re-ordering means 16 and the server 18 can all be configured into a single unit or entity which can also be referred to as a server.

Figure 10:
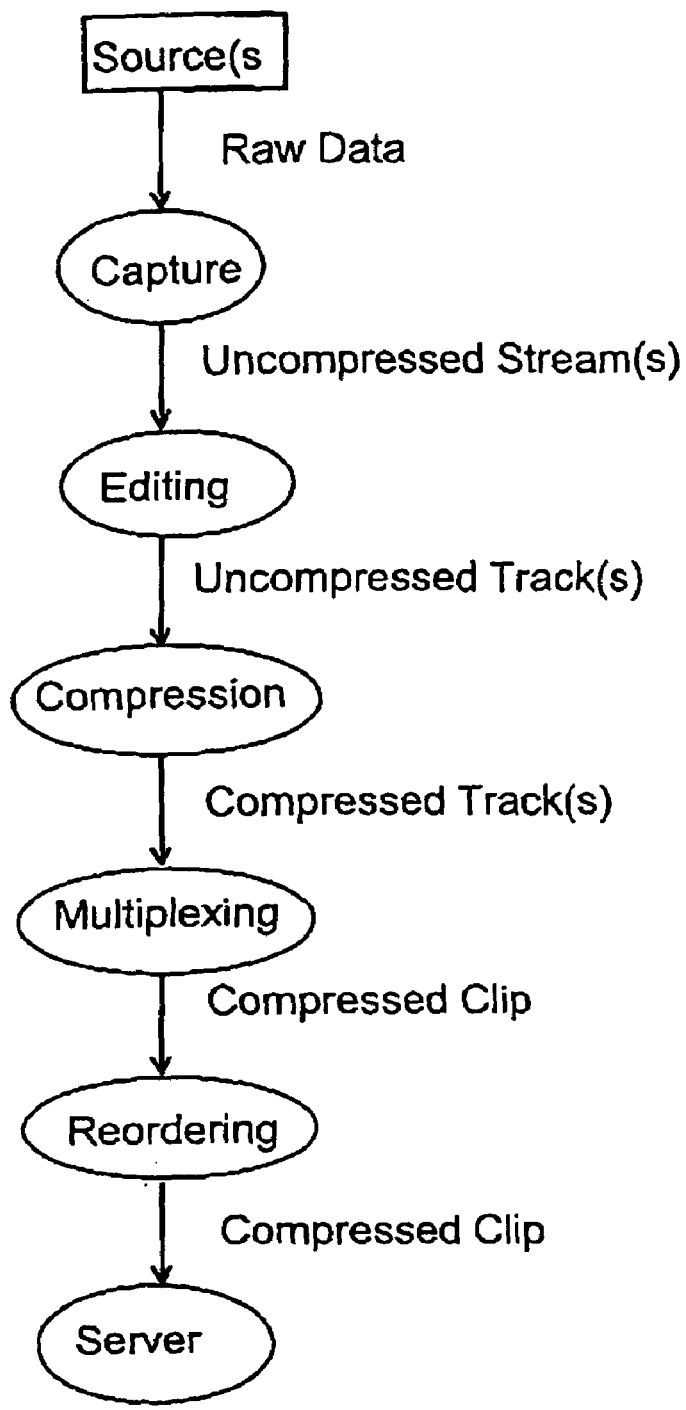
FIG. 10 shows operations of an editor according to the invention.

FIG. 10 shows operation of an editor according to the invention. Raw data captured in the form of one or more uncompressed streams are edited to produce one or more uncompressed tracks. These tracks are compressed in a compression step to produce compressed tracks. The compressed tracks are multiplexed together to produce a compressed multimedia clip. The multimedia clips are coded scalably. The resulting bitstream consists of basic units, such as frames in video compression. These basic units are not all of equal importance; some are primary basic units which are vital to decode the bitstream and some are secondary basic units which improve the quality of the bitstream. Elimination of the secondary basic units causes only a quality loss in the decoded multimedia clip. In effect, the primary basic units are a base layer of the bitstream and the secondary units are enhancement layers.

Instead of organising the basic units into the original transmission order, that is the sequence in which they are produced by editing and compression of raw data, the invented method re-orders their sequence by prioritising the primary basic units so that they pre-empt the secondary basic units in the transmission order. Reordering can take place before or after the multiplexing process depending on the nature of the system and the data. In FIG. 10 it is shown as taking place after multiplexing.

A re-ordering algorithm is used to re-order the sequence. In a preferred embodiment, the algorithm conducts stream analysis to identify primary and secondary basic units and to collect bit rate statistics. These may include the number of bits per frame. The bitstream is then re-ordered with iterative re-ordering steps to minimise the initial buffering time needed for full-quality playback with full channel throughput and reduced-quality playback with a reduced channel throughput. An example of such a re-ordering algorithm is given below. It should be noted that the expected reduced channel throughput has to be estimated in advance since it is one of the input parameters of the algorithm. The estimation can be based on the statistics obtained from the channel behaviour, for example.

Re-ordering of the basic units means that the primary basic units are likely to be received earlier than indicated in their playback time even though some decrease in the channel throughput occurs. However, secondary basic units are vulnerable to transmission delay variations since the method schedules them to be received just before their indicated playback time. In this way the client is still likely to be able to play the primary basic units without pausing the playback, even if the channel throughput decreases considerably. The secondary basic units, on the other hand, may arrive later than their scheduled playback time and will not be used in playback.

Figure 11:
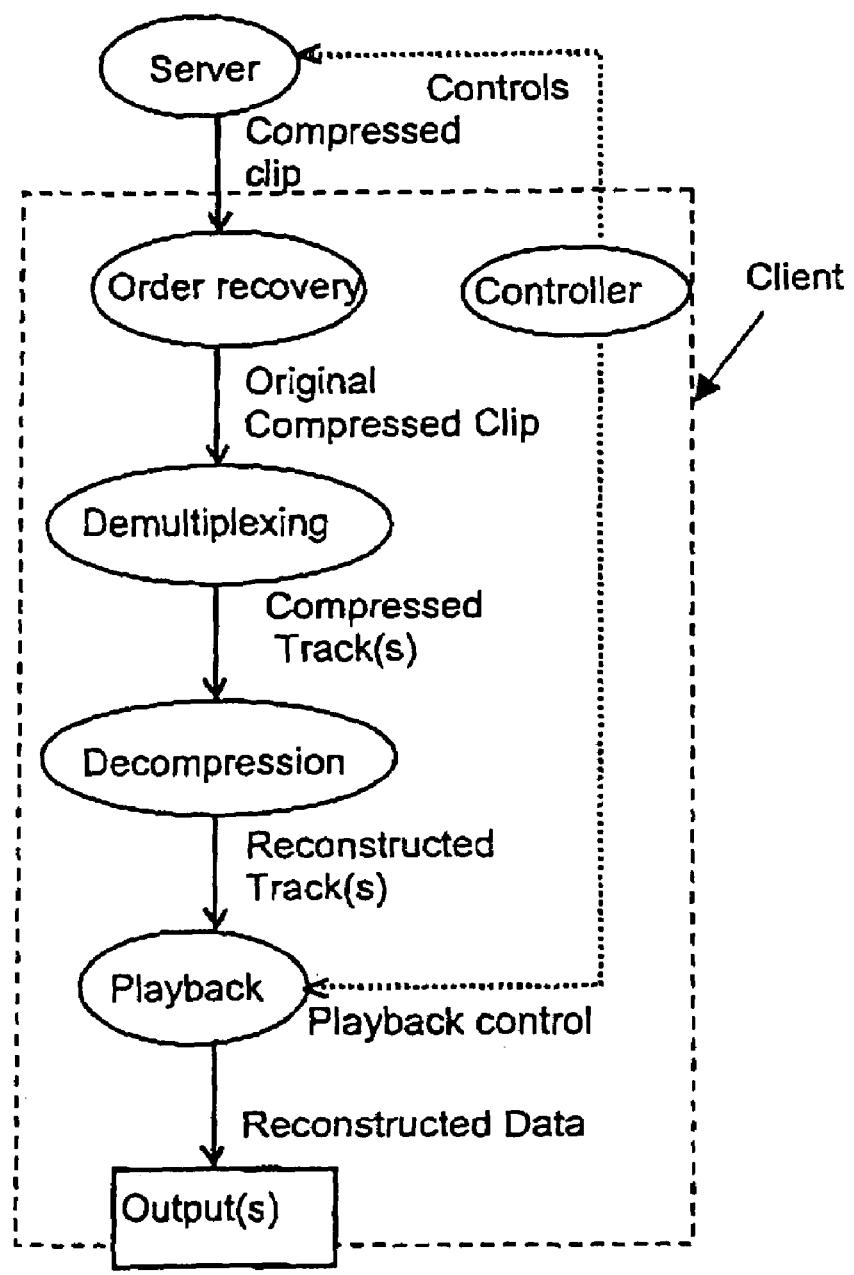
FIG. 11 shows operations of a client according to the invention.

FIG. 11 shows operation of a client according to the invention. The bitstream is received by the client, re-ordered to produce the original compressed clip, demultiplexed to produce the compressed tracks and then decompressed to reconstruct the tracks. The basic unit order recovery step in the client can be applied either before or after demultiplexing (depending in when it occurs in the content editor). In FIG. 11 it is shown as occurring before demultiplexing, to correspond to the order described in FIG. 10. In this way re-ordering and order recovery are both applied to the multiplexed bitstream. Order recovery organises the basic units back into their natural sequence for decompression and discards all late-arriving secondary basic units.

On receipt of a basic unit by the client, it is time-stamped with a time by which it should be played. This time-stamp is compared with the current playback time. If the time-stamp is greater than the current playback time the basic unit is not decompressed and it is discarded. If the time-stamp is less than the current playback time the basic unit is decompressed and the two times are compared after decompression. If the time stamp is less than the current playback time the basic unit is played. Otherwise, it is discarded.

In the particular case in which re-ordering is performed after multiplexing, the multiplexing/demultiplexing format used needs to allow re-ordering of the basic units and recovery of the original order.

Figure 15:
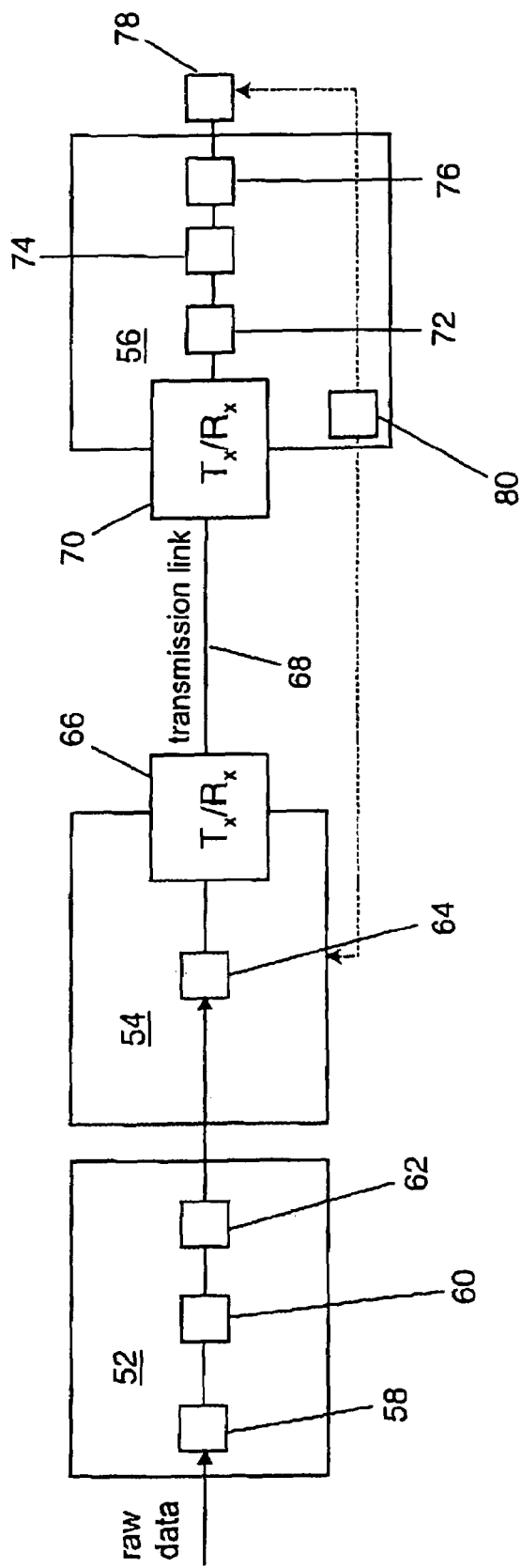
FIG. 15 shows another multimedia content creation and retrieval system.

FIG. 15 shows another view of a multimedia content creation and retrieval system according to the invention. The system 50 comprises an editor 52, a server 54 and a client 56.

The editor comprises a compressor 58 for compressing a raw data stream typically being in the form of a sequence of images into a form suitable for transmission, a multiplexer 60 for multiplexing the compressed raw data stream with other compressed data streams together to produce a compressed bitstream and layer generation means 62 for producing primary basic frames which are vital to decode the bitstream and secondary basic frames which improve the quality of the bitstream.

The server 54 comprises re-ordering means 64 for arranging the frames in an order which depends on their importance in helping to reconstruct the raw data stream at the client 56 rather than their natural sequential order.

The server 54 and the client 56 each comprise transmitting/receiving means 66 and 70 respectively for data transmission over a transmission link 68 between the server 54 and the client 56.

The client 56 comprises order recovery means 72 for putting the frames back into their natural sequential order, a demultiplexer 74 for demultiplexing the bitstream and a decompressor 76 for decompressing the compressed data streams to reproduce the raw data stream. The client comprises playing/output means 78 for playing or otherwise outputting the raw data stream. The client also comprises a controller 80 which applies a control signal to the server 54 to control the re-ordering means in response to receipt of frames in the client 56.

EXAMPLE

An embodiment of the invention was tested using an H.263 compliant encoder and a frame re-ordering tool. The encoder was capable of producing B-frames. The re-ordering tool comprised a re-ordering algorithm and could be adjusted to produce frame ordering for different decreased channel data rates.

A standard ITU-T test sequence of video frames called Glasgow was used. The sequence had a QCIF resolution, that is a luminance picture size of 176×144 pixels and a chrominance picture size of 88×72 pixels.

The first 297 frames of the Glasgow sequence were compressed to produce a temporally scalable bitstream comprising INTRA (I) frames, INTER (P) frames and bi-directionally predicted (B) frames. The I and P frames are referred to as primary frames and the B frames are referred to as secondary frames. The frame rate of the original (default) sequence was 12.5 frames per second (fps) and so the compressed sequence corresponded to 23.68 seconds. Each frame was compressed. The first frame was an INTRA frame, and the second one was an INTER frame. After that, there were alternate INTER frames and B-frames. A constant quantizer was used to produce a bitstream having an average bit rate of 41073 bps consisting of an average bit rate for the primary frames of 28984 bps and an average bit rate for the secondary frames of 12089 bps.

For the sake of simplicity, the example does not include multiplexing of the bitstream with another bitstream.

Re-ordering of the frame sequence was optimised separately for bit rates corresponding to sums of the primary frame bit rate (A) and (i) 25%; (ii) 50%; and (iii) 75% of the secondary frame bit rate (B). It should be noted that 100% of the secondary bit rate (B) corresponds to the average bit rate required in order to obtain full quality playback. The summed bit rates were 32007, 35029 and 38051 bps respectively. For convenience, in the following description, these bit rates are referred to as 25% (A+0.25B), 50% (A+0.5B) and 75% (A+0.75B), and the corresponding re-ordered sequences are referred to as 25-ordered, 50-ordered and 75-ordered. It was expected that the full rate of the channel would be the average bit rate of the sequence.

The reordering algorithm used two values:

FQFR (full quality full rate), which is the minimum initial buffering time to ensure full-quality playback assuming a full rate channel; and RQRR (reduced quality reduced rate) which is the minimum initial buffering time to ensure reduced-quality playback in which the primary frames are played and some or all secondary frames may not be played (assuming a reduced secondary bit rate of 25%, 50% or 75%).

In calculating FQFR and RQRR for a particular channel, the algorithm assumes that it has a constant bit rate. Using the bit rate statistics the likely number of bits per frame is calculated. The time instant at which a particular frame is to be played is known from the time stamp. A time is determined by which a frame will be ready for display as a picture (allowing, of course, for the time needed to receive the bits for a frame and to prepare them) and this time is compared with the time stamp of the frame. If the frame will be received after it is to be displayed, the buffering time is increased, if it is received in time then the next frame can be dealt with. Once the algorithm has compared the likely times of receipt of all of the frames against their playback times and adjusted to buffering time accordingly so that they should all be received in time, the minimum buffering time has been calculated.

The algorithm was applied to a sequence having its original order. In this case, FQFR is smaller than RQRR because in order to obtain full quality playback, you have to wait longer in starting playback if you have a reduced rate channel. The algorithm seeks to minimise the initial buffering time needed for full-quality playback with full channel throughput and at the same time for reduced-quality playback with a reduced channel throughput. In other words, the algorithm seeks to find a value where FQFR and RQRR are approximately equal. It should be noted that the algorithm is not optimal, that is the algorithm does not necessarily re-order the sequence so that the minimum initial buffering delay is found. The algorithm consists of the following steps:

1. Calculate FQFR and RQRR.

2. If FQFR is greater than or equal to RQRR, stop re-ordering. The minimum initial buffering delay is the greater of FQFR or RQRR. Otherwise, continue with the next step.

3. Shift all primary frames towards the beginning of the sequence by one frame step. For example, if the initial sequence is:

I0, P1, P2, B3, P4, B5, P6, B7, P8, B9, P10, . . . , shifting changes the sequence to:

I0, P1, P2, P4, B3, P6, B5, P8, B7, P10, B9, . . . , where I0 is the first frame. It can be seen that where a secondary frame is earlier in sequence than an adjacent primary frame, the positions of the primary and secondary frames are exchanged.

4. Continue from step 1.

The buffering time needed to ensure pause-less playback in the reduced bit rate channel is greater for the original sequence than for the re-ordered sequence. It is desirable to have a short initial buffering time. The re-ordering process makes a trade-off between the minimum buffering time needed for a full-rate channel and the minimum buffering time needed for expected reduced-rate channels. Without re-ordering, less initial buffering time would have been needed to provide full-quality playback in the full-rate channel. However, without re-ordering, more initial buffering time would have been required to provide reduced-quality playback in the reduced-rate channel.

Figure 12:
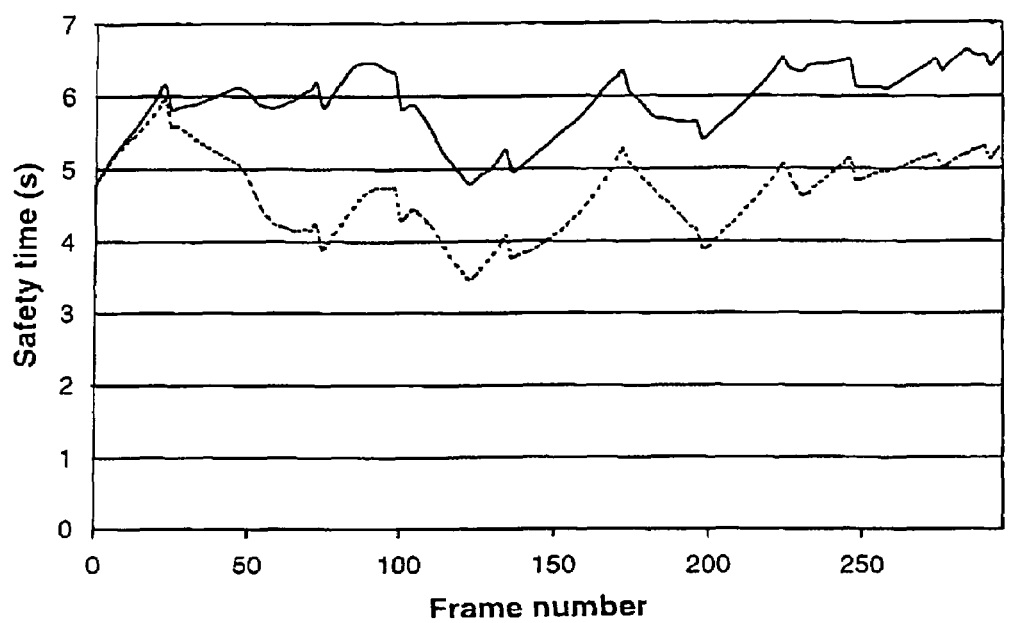
FIG. 12 shows safety times of a re-ordered sequence and an original sequence.

In the example, safety times were also investigated. Initial buffering time was set to be the minimum for reduced quality playback of the re-ordered sequence at 25% secondary bit rate. FIG. 12 shows how safety time varies with playback of the 25-ordered sequence and the original order sequence. It shows that throughout playback, the 25-ordered sequence (represented by the upper line) has a longer safety time than the original order sequence.

Results were also obtained for the 50% and 75% secondary bit rates. The average safety times (in seconds) for all primary frames in a sequence are shown in the following table for all three reduced bit rates. The safety times are characterised by minimum safety time and average safety time.

|  |  | 25% | 50% | 75% |
|---|---|---|---|---|
| Minimum | Re-ordered | 4.79 | 2.51 | 1.06 |
|  | Default | 3.46 | 1.63 | 0.64 |
|  | Difference | 1.33 | 0.88 | 0.42 |
| Average | Re-ordered | 5.90 | 3.51 | 2.12 |
|  | Default | 4.66 | 2.83 | 1.84 |
|  | Difference | 1.24 | 0.67 | 0.28 |

It can be seen that both the minimum and average safety times of the re-ordered sequences are longer than those of the original sequence.

In contrast, set out below is a table showing the required buffering delays in seconds for full-quality playback at different average bit rates. This is to minimise pauses in playback.

|  | 25% | 50% | 75% |
|---|---|---|---|
| Re-ordered | 10.04 | 6.03 | 3.53 |
| Default | 7.02 | 4.64 | 3.02 |

It can be seen that the re-ordered sequence needs a longer buffering delay for full-quality playback because the secondary frames are transmitted out of their natural order and time is required to put all the frames back into their natural order. However, this is not important because the invention sets out to provide reduced quality playback with minimal initial buffering delay. To illustrate this, the following table shows the buffering delays required to ensure pause-less reduced quality playback:

|  | 25% | 50% | 75% |
|---|---|---|---|
| Re-ordered | 5.28 | 3.49 | 2.47 |
| Default | 6.91 | 4.46 | 2.84 |

These results show that where the bit rate of the transmission channel is reduced, the invented method requires a shorter buffering delay before playback can be started.

Figure 13:
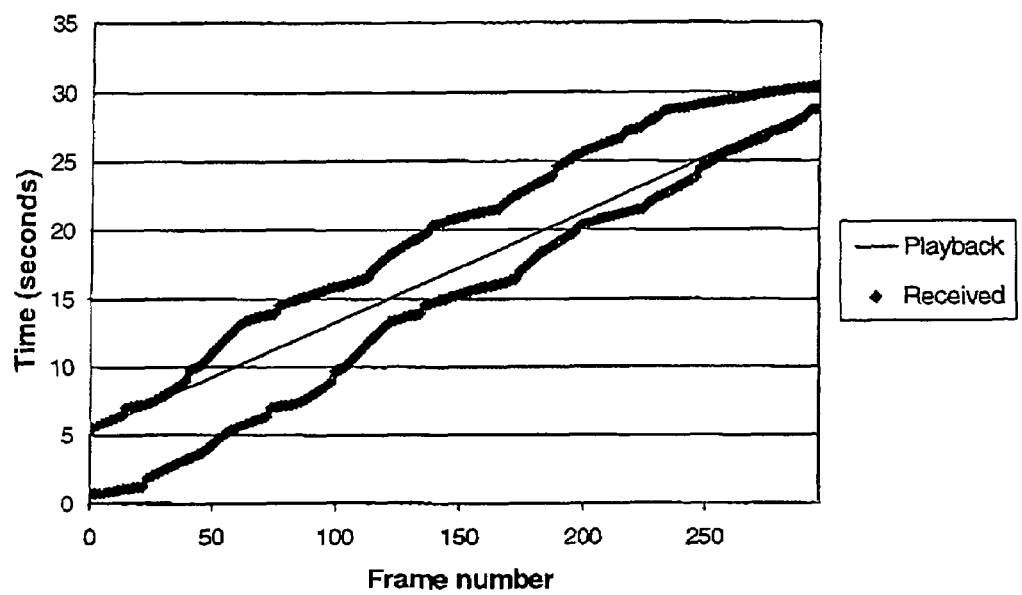
FIG. 13 shows receiving and playback of a re-ordered sequence.

The effect of the invention is illustrated in FIG. 13 which shows playback of the 25-ordered sequence at 25% bit rate (that is A+0.25B as discussed above). Playback times, that is the times at which the frames are intended or supposed to be played to a viewer, are represented as a straight line. To be played in sequence, without requiring pauses, each frame must be received before its playback time. Any symbol located below the playback time line represents a frame which is received before its scheduled playback time and any symbol located above the playback time line represents a frame which is received after its scheduled playback time. In the example of FIG. 13, the primary frames were all received in time to be played and the secondary frames were all received too late. Therefore the secondary frames were all discarded without being played.

It should be understood that if the sequence had not been re-ordered, there is a likelihood that some of the primary frames would have arrived after their playback times and so would have required playback to be paused (since a primary frame cannot be discarded without also discarding all of the frames predicted from it).

Figure 14:
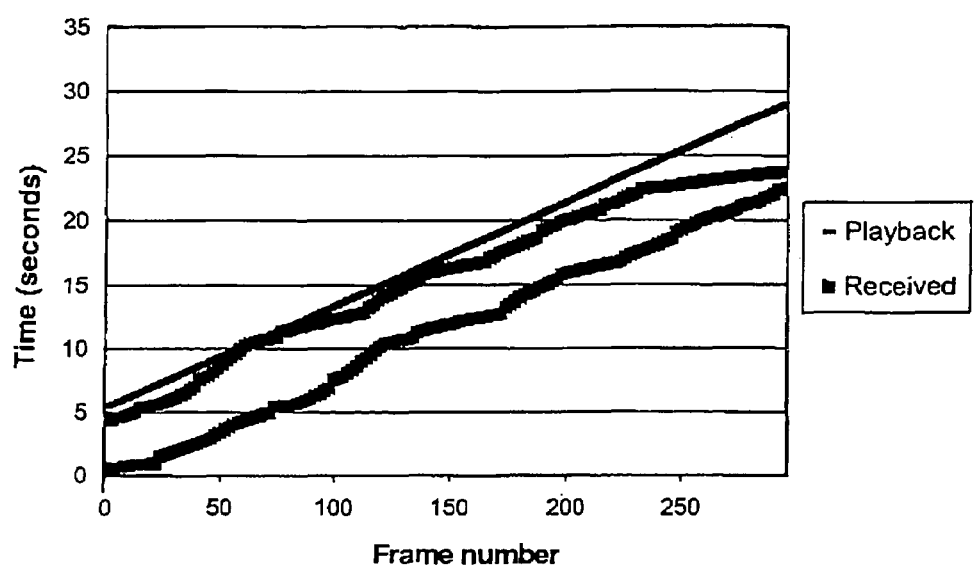
FIG. 14 also shows receiving and playback of a re-ordered sequence.

FIG. 14 shows how the 25-ordered sequence is received and played when the channel throughput is not reduced. It can be seen that all frames are received in time to be played. Again, the upper line represents when secondary frames are received and the lower line represents when primary frames are received.

Of course, the exact appearance of FIGS. 13 and 14 depends on the nature of the original sequence, as well as the bit rate and the re-ordering that is performed. Differences can be expected in other systems which re-order data in different ways.

In use, the invention can be applied on-line to prepare a bitstream for transmission at some future point. For example, assuming that there may be considerable variation in the available bandwidth of a given transmission channel, the algorithm may be applied to a bitstream and re-ordered sequences may be calculated for several alternative bandwidths, such as 25%, 50% and 75%. In transmission, if problems are encountered, for example with pausing, the re-ordered sequence currently being used may be changed to one better suited to a lower available bandwidth. Equally, if transmission is proceeding better than expected, a sequence better suited for a higher bandwidth may be used. The invention may check the progress of transmission and/or playback a number of times during transmission and adjust the sequence accordingly. It is advantageous if this adjustment can be programmed dynamically whilst transmission is occurring. In this way, intermittent problems can de dealt with.

The part of the invention which re-orders a bitstream is located in an editor or in a server. The part of the invention which recovers the order is located in a client.

A further improvement is provided if the proportion of bits belonging to the primary frames is reduced by replacing some of the primary frames with B-frames. This reduces the compression efficiency slightly because B-frames are predicted from reference frames (P-frames) which are further away in time and so the B-frames and P-frames are less alike. This yields a poorer predicted B-frame and so more bits must be used to code the corresponding prediction error image. Since in this arrangement there are now more bits belonging to secondary frames which can be discarded, re-ordering the frames can provide even better protection against transmission delays and pauses.

One way of looking at the invention is to say that it sacrifices the safety times of the secondary frames in order to maintain maximum safety times for the primary frames.

The invention is particularly suitable for streaming-type multimedia retrieval.

While preferred embodiments of the invention have been shown and described, it will be understood that such embodiments are described by way of example only. For example, although the invention has been described applied to a temporally scalable bitstream, it can also be applied to other types of scalability, including spatial, spectral and SNR. Numerous variations, changes and substitutions will occur to those skilled in the art without departing from the scope of the present invention. Accordingly, it is intended that the following claims cover all such variations as fall within the spirit and scope of the invention.

The invention claimed is:

1. A server for streaming a data signal over a transmission link to a client for streaming playback at the client, the data signal comprising a sequence of data units including primary data units and secondary data units, the primary and secondary data units having a scheduled playback time for streaming playback at the client, the primary and secondary data units being ordered in the data signal according to an original data unit order, the server comprising a re-ordering unit for changing the order of primary and secondary data units in the sequence of data units by exchanging a secondary data unit that precedes a primary data unit in the original data unit order with the primary data unit so as produce a re-ordered data signal with a modified data unit order in which the primary data unit precedes the secondary data unit in the sequence of data units, thereby increasing the likelihood that the primary data unit will be received at the client in time to be played back at its scheduled playback time during streaming playback at the client.

2. A server according to claim 1, in which the primary data units represent a base layer and the secondary data units represent at least one enhancement layer.

3. A server according to claim 1, in which the data signal is scalable.

4. A server according to claim 3, in which the signal is scalable in a domain selected from the group consisting of the temporal, the spatial, the spectral and the SNR domains.

5. A server according to claim 1 which comprises an editor for providing the data signal.

6. A server according to claim 1 in which the data signal represents a sequence of pictures to produce a moving image.

7. A server according to claim 6 in which the data signal represents a video sequence.

8. A server according to claim 1 in which the data signal comprises multimedia data.

9. A server according to claim 1, wherein the re-ordering unit is arranged to:
calculate a buffering time required at the client for full quality streaming playback of the data signal at the client when the data units are streamed over the transmission channel from the server to the client in the original data unit order at a full transmission rate equal to the average bit-rate of the data signal;
calculate a buffering time required at the client for reduced quality streaming playback of the data signal at the client, when the data units are streamed over the transmission channel from the server to the client in the original data unit order at a reduced transmission rate less than the average bit-rate of the data signal;
shift the position of each primary data unit in the sequence of data units towards the beginning of the sequence of data units, so that where a primary data unit is preceded by a secondary data unit in the sequence of data units, the positions of the primary and secondary data units are exchanged, thereby producing a re-ordered data signal with a modified data unit order different from the original data unit order;
re-calculate the buffering time required at the client for full quality streaming playback of the data signal assuming the data units are streamed over the transmission channel from the server to the client in the modified data unit order;
re-calculate the buffering time for reduced quality playback of the data signal at the client assuming the data units are streamed over the transmission channel from the server to the client in the modified data unit order;
repeat the step of shifting the position of each primary data unit in the sequence of data units towards the beginning of the sequence of data units and the steps of re-calculating the buffering times required for full and reduced quality streaming playback at the client until the buffering time required for full quality streaming playback of the data signal at the client is greater than or equal to the buffering time for reduced quality streaming playback of the data signal at the client.

10. A server according to claim 9, wherein the re-ordering unit is arranged to calculate the buffering time for full quality streaming playback of the data signal at the client by:
determining a time by which a first data unit of the data signal will be ready for playback at the client assuming that the transmission channel has a constant transmission rate equal to the average bit-rate of the data signal;
comparing the time when the first data unit will be ready for playback at the client with the scheduled playback time of the first data unit to determine whether the first data unit will be received at the client in time to played back at its scheduled playback time;
if the first data unit will be received at the client too late to be played back at its scheduled playback time, increasing the buffering time so that the first data unit should be received in time; and
repeating the aforementioned steps for each data unit of the data signal.

11. A server according to claim 9, wherein the re-ordering unit is arranged to calculate the buffering time for reduced quality streaming playback of the data signal at the client by:
determining a time by which a first data unit of the data signal will be ready for playback at the client assuming that the transmission channel has a constant transmission rate equal to an average bit-rate for the primary data units plus a certain percentage of an average bit-rate for the secondary data units;
comparing the time when the first data unit will be ready for playback at the client with the scheduled playback time of the first data unit to determine whether the first data unit will be received at the client in time to be played back at its scheduled playback time;
if the first data unit will be received at the client too late to be played back at its scheduled playback time, increasing the buffering time so that the first data unit should be received in time; and
repeating the aforementioned steps for each data unit of the data signal.

12. A server according to claim 1, wherein the re-ordering unit is arranged to estimate an expected reduced channel transmission rate in advance.

13. A server according to claim 1, wherein the re-ordering unit is arranged to estimate an expected reduced channel transmission rate based on statistics obtained from the behaviour of the transmission channel.

14. A server according to claim 1, wherein the re-ordering unit is arranged to re-order the data signal to produce re-ordered data signals for several alternative transmission rates.

15. A server according to claim 1, wherein the re-ordering unit is arranged to adjust the sequence of data units dynamically whilst transmission is occurring.

16. A server according to claim 1, wherein the re-ordering unit is further arranged to replace some of the primary data units with secondary data units before changing the order of the primary and secondary data units.

17. A server according to claim 1, wherein the re-ordering unit is arranged to re-order the data units of a data signal for transmission over a transmission channel having a data transmission bandwidth that would otherwise be insufficient for transmitting the data signal.

18. A server according to claim 1, wherein the re-ordering unit is arranged to re-order the data units of a data signal for streaming over a transmission channel so as to make a certain portion of an available bandwidth available for transmission of other data.

19. A server according to claim 1, wherein the data signal is a digital video signal, the primary data units comprise INTRA coded I frames and INTER coded P frames and the secondary data units are bi-directionally predicted B frames.

20. A data transmission system including a server for streaming a data signal over a transmission link from the server to a client for streaming playback at the client, the data signal comprising a sequence of data units including primary data units and secondary data units, the primary and secondary data units having a scheduled playback time for streaming playback at the client, the primary and secondary data units being ordered in the data signal according to an original data unit order, the system comprising a re-ordering unit, for changing the order the primary and secondary data units in the sequence of data units by exchanging a secondary data unit that precedes a primary data unit in the original data unit order with the primary data unit so as to produce a re-ordered data signal with a modified data unit order in which the primary data unit precedes the secondary data unit in the sequence of data units, thereby increasing the likelihood that the primary data unit will be received at the client in time to be played back at its scheduled playback time during streaming playback at the client.

21. A data transmission system according to claim 20, in which the server comprises an editor for providing a scalable data signal.

22. A data transmission system according to claim 20, in which the client is a mobile terminal.

23. A data transmission system according to claim 20, in which the client is a mobile telephone.

24. A data transmission system according to claim 20, in which means are provided to check the progress of transmission and to change the data unit order being used to one better suited to available bandwidth.

25. A data transmission system according to claim 20, wherein the re-ordering unit is arranged to re-order the data signal to produce re-ordered data signals for several alternative transmission rates and the data transmission system is arranged to switch to a re-ordered data signal better suited to a lower transmission rate if problems are encountered due to pauses in streaming playback at the client.

26. A data transmission system according to claim 20, wherein the data transmission system is arranged to check the progress of at least one of transmission and playback at the client and the re-ordering unit is arranged to adjust the sequence of data units dynamically whilst transmission is occurring.

27. A method of streaming a data signal over a transmission link from a server to a client for streaming playback at the client, the data signal comprising a sequence of data units including primary data units and secondary data units, the primary and secondary data units having a scheduled playback time for streaming playback at the client, the primary and secondary data units being ordered in the data signal according to an original data unit order, the method comprising changing the order of primary and secondary data units in the sequence of data units by exchanging a secondary data unit that precedes a primary data unit in the original data unit order with the primary data unit so as to produce a re-ordered data signal with a modified data unit order in which the primary data unit precedes the secondary data unit in the sequence of data units, thereby increasing the likelihood that the primary data unit will be received at the client in time to be played back at its scheduled playback time during streaming playback at the client.

28. A method of transmitting a data signal according to claim 27, in which the primary and secondary data units are returned to the original data unit order once they have been transmitted over the transmission link.

29. A method of transmitting a data signal according to claim 27, comprising checking the progress of transmission and changing the data unit the order to one better suited to available bandwidth.

30. A method of streaming a data signal according to claim 27, comprising:
   calculating a buffering time required at the client for full quality streaming playback of the data signal at the client when the data units are streamed over the transmission channel from the server to the client in the original data unit order at a full transmission rate equal to the average bit-rate of the data signal;
   calculating a buffering time required at the client for reduced quality streaming playback of the data signal at the client, when the data units are streamed over the transmission channel from the server to the client in the original data unit order at a reduced transmission rate less than the average bit-rate of the data signal;
   shifting the position of each primary data unit in the sequence of data units towards the beginning of the sequence of data units, so that where a primary data unit is preceded by a secondary data unit in the sequence of data units, the positions of the primary and secondary data units are exchanged, thereby producing a re-ordered data signal with a modified data unit order different from the original data unit order;
   re-calculating the buffering time required at the client for full quality streaming playback of the data signal assuming the data units are streamed over the transmission channel from the server to the client in the modified data unit order;
   re-calculating the buffering time for reduced quality streaming playback of the data signal at the client assuming the data units are streamed over the transmission channel from the server to the client in the modified data unit order;
   repeating the step of shifting the position of each primary data unit in the sequence of data units towards the beginning of the sequence of data units and the steps of re-calculating the buffering times required for full and reduced quality streaming playback at the client until the buffering time required for full quality streaming playback at the client is greater than or equal to the buffering time for reduced quality streaming playback of the data signal at the client.

31. A method of streaming a data signal according to claim 30, wherein the buffering time for full quality streaming playback of the data signal at the client is calculated by:
   determining a time by which a first data unit of the data signal will be ready for playback at the client assuming that the transmission channel has a constant transmission rate equal to the average bit-rate of the data signal;
   comparing the time when the first data unit will be ready for playback at the client with the scheduled playback time of the first data to determine whether the first data unit will be received at the client in time to played back at its scheduled playback time;
   if the first data unit will be received at the client too late to be played back at its scheduled playback time, increasing the buffering time so that the first data unit should be received in time; and repeating the aforementioned steps for each data unit of the data signal.

32. A method of streaming a data signal according to claim 30, wherein the buffering time for reduced quality streaming playback of the data signal at the client is calculated by:
determining a time by which a first data unit of the data signal will be ready for playback at the client assuming that the transmission channel has a constant transmission rate equal to an average bit-rate for the primary data units plus a certain percentage of an average bit-rate for the secondary data units;
comparing the time when the first data unit will be ready for playback at the client with the scheduled playback time of the first data unit to determine whether the first data unit will be received at the client in time to be played back at its scheduled playback time;
if the first data unit will be received at the client too late to be played back at its scheduled playback time, increasing the buffering time so that the first data unit should be received in time; and
repeating the aforementioned steps for each data unit of the data signal.

33. A method of streaming a data signal according to claim 27, comprising estimating an expected reduced channel transmission rate in advance.

34. A method of streaming a data signal according to claim 27, comprising estimating an expected reduced channel transmission rate based on statistics obtained from the behaviour of the transmission channel.

35. A method of streaming a data signal according to claim 27, comprising:
re-ordering the data signal to produce re-ordered data signals for several alternative transmission rates; and
switching to a re-ordered data signal better suited to a lower transmission rate if problems are encountered due to pauses in streaming playback at the client.

36. A method of streaming a data signal according to claim 27, comprising checking the progress of at least one of transmission and playback at the client and adjusting the sequence of data units dynamically whilst transmission is occurring.

37. A method of streaming a data signal according to claim 27, further comprising replacing some of the primary data units with secondary data units, before changing the order of the primary and secondary data units.

38. A method of streaming a data signal according to claim 27, comprising applying the method to re-order the data units of a data signal for transmission over a transmission channel having a data transmission bandwidth that would otherwise be insufficient for transmitting the data signal.

39. A method of streaming a data signal according to claim 27, comprising applying the method to re-order the data units of a data signal for streaming over a transmission channel, so as to make a certain portion of an available bandwidth available for transmission of other data.

40. A method of streaming a data signal according to claim 27, wherein the data signal is a digital video signal, the primary data units comprise INTRA coded I frames and INTER coded P frames and the secondary data units are bi-directionally predicted B frames.

41. A method of streaming a data signal according to claim 27, wherein the data signal is a scalable data signal having a base layer and at least one enhancement layer.

42. A method of streaming a data signal according to claim 41, wherein the data signal is signal is scalable in a domain selected from a group consisting of the temporal, the spatial, the spectral and the SNR domains.

43. A computer-readable medium embodying a computer program executable by one or more processors, wherein a computer code of the program comprises instructions, when executed, directing the one or more processors to perform a method comprising:
streaming a data signal over a transmission link from a server to a client for streaming playback at a client, the data signal comprising a sequence of data units including primary data units and secondary data units, the primary and secondary data units having a scheduled playback time at the client, the primary and secondary data units being ordered in the data signal according to an original data unit order,
changing the order of primary and secondary data units in the sequence of data units by exchanging a secondary data unit that precedes a primary data unit in the original data unit order with the primary data unit so as to produce a re-ordered data signal with a modified data unit order in which the primary data unit precedes the secondary data unit in the sequence of data units, thereby increasing the likelihood that the primary data unit will be received at the client in time to be played back at its scheduled playback time during streaming playback at the client.

44. A computer-readable medium according to claim 43, wherein the method further comprises an editing of the data signal for providing a scalable data signal.

45. A computer-readable medium according to claim 43, wherein the method further comprises:
calculating a buffering time required at the client for full quality streaming playback of the data signal at the client when the data units are streamed over the transmission channel from the server to the client in the original data unit order at a full transmission rate equal to the average bit-rate of the data signal;
calculating a buffering time required at the client for reduced quality streaming playback of the data signal at the client, when the data units are streamed over the transmission channel from the server to the client in the original data unit order at a reduced transmission rate less than the average bit-rate of the data signal;
shifting the position of each primary data unit in the sequence of data units towards the beginning of the sequence of data units, so that where a primary data unit is preceded by a secondary data unit in the sequence of data units, the positions of the primary and secondary data units are exchanged, thereby producing a re-ordered data signal with a modified data unit order different from the original data unit order;
re-calculating the buffering time required at the client for full quality streaming playback of the data signal assuming the data units are streamed over the transmission channel from the server to the client in the modified data unit order;
re-calculating the buffering time for reduced quality streaming playback of the data signal at the client assuming the data units are streamed from over the transmission channel from the server to the client in the modified data unit order;
repeating the step of shifting the position of each primary data unit in the sequence of data units towards the beginning of the sequence of data units and the steps of re-calculating the buffering times required for full and reduced quality streaming playback at the client until the buffering time required for full quality streaming playback at the client is greater than or equal to the buffering time for reduced quality streaming playback of the data signal at the client.

46. A computer-readable medium according to claim 45, wherein the method further comprises:
calculating the buffering time for full quality streaming playback of the data signal at the client by:
determining a time by which a first data unit of the data signal will be ready for playback at the client assuming that the transmission channel has a constant transmission rate equal to the average bit-rate of the data signal;
comparing the time when the first data unit will be ready for playback at the client with the scheduled playback time of the first data to determine whether the first data unit will be received at the client in time to played back at its scheduled playback time;
if the first data unit will be received at the client too late to be played back at its scheduled playback time, increasing the buffering time so that the first data unit should be received in time; and
repeating the aforementioned steps for each data unit of the data signal.

47. A computer-readable medium according to claim 45, wherein the method further comprises:
calculating the buffering time for reduced quality streaming playback of the data signal at the client by:
determining a time by which a first data unit of the data signal will be ready for playback at the client assuming that the transmission channel has a constant transmission rate equal to an average bit-rate for the primary data units plus a certain percentage of an average bit-rate for the secondary data units;
comparing the time when the first data unit will be ready for playback at the client with the scheduled playback time of the first data unit to determine whether the first data unit will be received at the client in time to be played back at its scheduled playback time;
if the first data unit will be received at the client too late to be played back at its scheduled playback time, increasing the buffering time so that the first data unit should be received in time; and
repeating the aforementioned steps for each data unit of the data signal.

48. A computer-readable medium according to claim 43, wherein the method further comprises estimating an expected reduced channel transmission rate in advance.

49. A computer-readable medium according to claim 43, wherein the method further comprises estimating an expected reduced channel transmission rate based on statistics obtained from the behaviour of the transmission channel.

50. A computer-readable medium according to claim 43, wherein the method further comprises:
re-ordering the data signal to produce re-ordered data signals for several alternative transmission rates; and
switching to a re-ordered data signal better suited to a lower transmission rate if problems are encountered due to pauses in streaming playback at the client.

51. A computer-readable medium according to claim 43, wherein the method further comprises:
checking the progress of transmission and checking the progress of playback at the client; and
adjusting the sequence of data units dynamically whilst transmission is occurring.

52. A computer-readable medium according to claim 43, wherein the method further comprises replacing some of the primary data units with secondary data units, before changing the order of the primary and secondary data units.

53. A computer-readable medium according to claim 43, wherein the method further comprises changing the order of the primary and secondary data units is arranged to re-order the data units of a data signal for transmission over a transmission channel having a data transmission bandwidth that would otherwise be insufficient for transmitting the data signal.

54. A computer-readable medium according to claim 43, wherein the method further comprises changing the order of the primary and secondary data units is arranged to re-order the data units of a data signal for streaming over a transmission channel, so as to make a certain portion of an available bandwidth available for transmission of other data.

55. A server for streaming a data signal over a transmission link, the server re-ordering the data signal for streaming over a transmission channel to a client for playback at the client, the data signal comprising a sequence of data units including primary data units and secondary data units, the primary and secondary data units having a scheduled playback time for streaming playback at the client, the primary and secondary data units being ordered in the data signal according to an original data unit order, the re-ordering being accomplished by:
identifying primary and secondary data units in the sequence of data units;
determining a relative importance of the primary and secondary data units; and
changing the order of the primary and secondary data units in the sequence of data units by exchanging a secondary data unit that precedes a primary data unit in the original data unit order with the primary data unit so as to produce a re-ordered data signal with a modified data unit order in which the primary data unit precedes the secondary data unit in the sequence of data units, thereby increasing the likelihood that the primary data unit will be received at the client in time to be played back at its scheduled playback time during streaming playback at the client.

56. A server according to claim 55, wherein the re-ordering further comprises:
calculating a buffering time required at the client for full quality streaming playback of the data signal at the client when the data units are streamed over the transmission channel from the server to the client in the original data unit order at a full transmission rate equal to the average bit-rate of the data signal;
calculating a buffering time required at the client for reduced quality streaming playback of the data signal at the client, when the data units are streamed over the transmission channel from the server to the client in the original data unit order at a reduced transmission rate less than the average bit-rate of the data signal;
shifting the position of each primary data unit in the sequence of data units towards the beginning of the sequence of data units, so that where a primary data unit is preceded by a secondary data unit in the sequence of data units, the positions of the primary and secondary data units are exchanged, thereby producing a re-ordered data signal with a modified data unit order different from the original data unit order;
re-calculating the buffering time required at the client for full quality streaming playback of the data signal assuming the data units are streamed over the transmission channel from the server to the client in the modified data unit order;

re-calculating the buffering time for reduced quality playback of the data signal at the client assuming the data units are streamed over the transmission channel from the server to the client in the modified data unit order; and repeating the step of shifting the position of each primary data unit in the sequence of data units towards the beginning of the sequence of data units and the steps of re-calculating the buffering times required for full and reduced quality streaming playback at the client until the buffering time required for full quality streaming playback of the data signal at the client is greater than or equal to the buffering time for reduced quality streaming playback of the data signal at the client.

57. A server according to claim 56, wherein the calculating of the buffering time, for full quality streaming playback of the data signal at the client, comprises:

determining a time by which a first data unit of the data signal will be ready for playback at the client assuming that the transmission channel has a constant transmission rate equal to the average bit-rate of the data signal;

comparing the time when the first data unit will be ready for playback at the client with the scheduled playback time of the first data unit to determine whether the first data unit will be received at the client in time to played back at its scheduled playback time;

if the first data unit will be received at the client too late to be played back at its scheduled playback time, increasing the buffering time so that the first data unit should be received in time; and repeating the aforementioned steps for each data unit of the data signal.

58. A server according to claim 56, wherein the calculating of the buffering time, for reduced quality streaming playback of the data signal at the client, comprises:

determining a time by which a first data unit of the data signal will be ready for playback at the client assuming that the transmission channel has a constant transmission rate equal to an average bit-rate for the primary data units plus a certain percentage of an average bit-rate for the secondary data units;

comparing the time when the first data unit will be ready for playback at the client with the scheduled playback time of the first data unit to determine whether the first data unit will be received at the client in time to be played back at its scheduled playback time;

if the first data unit will be received at the client too late to be played back at its scheduled playback time, increasing the buffering time so that the first data unit should be received in time; and repeating the aforementioned steps for each data unit of the data signal.

59. A server according to claim 55, wherein the re-ordering includes estimating an expected reduced channel transmission rate in advance.

60. A server according to claim 55, wherein the re-ordering includes estimating an expected reduced channel transmission rate based on statistics obtained from the behaviour of the transmission channel.

61. A server according to claim 55, wherein the re-ordering of the data signal includes producing re-ordered data signals for several alternative transmission rates.

62. A server according to claim 55, wherein the re-ordering includes adjusting the sequence of data units dynamically whilst transmission is occurring.

63. A server according to claim 55, wherein the re-ordering is for transmission of the data units of a data signal over a transmission channel having a data transmission bandwidth that would otherwise be insufficient for transmitting the data signal.

64. A server according to claim 55, wherein the re-ordering is for streaming of the data units of a data signal over a transmission channel so as to make a certain portion of an available bandwidth available for transmission of other data.

65. A client device for receiving a data signal for streaming playback at the client device, the data signal comprising a sequence of data units including primary data units and secondary data units, the primary and secondary data units having a scheduled playback time for streaming playback at the client device, an order of the primary and secondary data units in the sequence of data units having been changed with respect to an original data unit order by exchanging a secondary data unit that precedes a primary data unit in the original data unit order with the primary data unit so as to produce a re-ordered data signal with a modified data unit order in which the primary data unit precedes the secondary data unit in the sequence of data units, thereby increasing the likelihood that the primary data unit will be received at the client device in time to be played back at its scheduled playback time during streaming, the client device being arranged to receive the primary and secondary data units in the modified data unit order and to return the primary and secondary data units to the original data unit order.

66. A method of receiving a data signal for streaming playback, the data signal comprising a sequence of data units including primary data units and secondary data units, the primary and secondary data units having a scheduled playback time for streaming playback at the client device, an order of the primary and secondary data units in the sequence of data units having been changed with respect to an original data unit order by exchanging a secondary data unit that precedes a primary data unit in the original data unit order with the primary data unit so as to produce a re-ordered data signal with a modified data unit order in which the primary data unit precedes the secondary data unit in the sequence of data units, thereby increasing the likelihood that the primary data unit will be received at the client device in time to be played back at its scheduled playback time during streaming, the method comprising receiving the primary and secondary data units in the modified data unit order and returning the primary and secondary data units to the original data unit order.

* * * * *